United States Patent [19]
Dyer

[11] Patent Number: 5,157,815
[45] Date of Patent: Oct. 27, 1992

[54] CONDUIT CLAMP

[75] Inventor: Edward P. Dyer, Germantown, Wis.

[73] Assignee: Tyton Corporation, Milwaukee, Wis.

[21] Appl. No.: 772,262

[22] Filed: Oct. 7, 1991

[51] Int. Cl.[5] ............................................. B65D 63/00
[52] U.S. Cl. ..................................... 24/270; 24/20 R;
24/20 TT; 285/260
[58] Field of Search ............ 24/20 R, 20 TT, 20 EE,
24/23 EE, 20 CW, 16 R, 270, 273, 284, 21, 28,
543; 285/921, 260

[56] References Cited

U.S. PATENT DOCUMENTS

| | | | |
|---|---|---|---|
| 421,104 | 2/1890 | Mitchell | 24/21 |
| 1,441,154 | 1/1923 | Johnson | 24/20 TT |
| 1,579,719 | 4/1926 | Lavender | 24/20 TT |
| 3,229,998 | 1/1966 | Pennington | 24/16 R |
| 3,441,655 | 4/1969 | Turner | 285/260 |
| 3,805,340 | 4/1974 | Bush et al. | 24/543 |
| 4,183,120 | 1/1980 | Thorne | 24/16 R |
| 4,483,556 | 11/1984 | Livolsi | 24/16 R |
| 4,511,164 | 4/1985 | Orchard | 24/270 |

Primary Examiner—Victor N. Sakran
Attorney, Agent, or Firm—Michael, Best & Friedrich

[57] ABSTRACT

A snap-on clamp for securing a conduit includes an open-ended loop having interlocking clamping portions at each end. One clamping portion includes a plurality of teeth arrayed on the outer surface thereof and the other clamping portion comprises a first arm pivotally mounted on the band and extending toward the one clamping portion and a clamp arm pivotally mounted adjacent the free end of the first arm and extending backwardly toward the pivotal end thereof and having at least one tooth complementary with the teeth on the one clamping portion and engageable therewith. The first and clamp arms are movable into an overcenter clamped position when the teeth and the clamp arm are engaged in the teeth on the one clamping portion and the first arm is pivoted toward the one clamping portion.

8 Claims, 3 Drawing Sheets

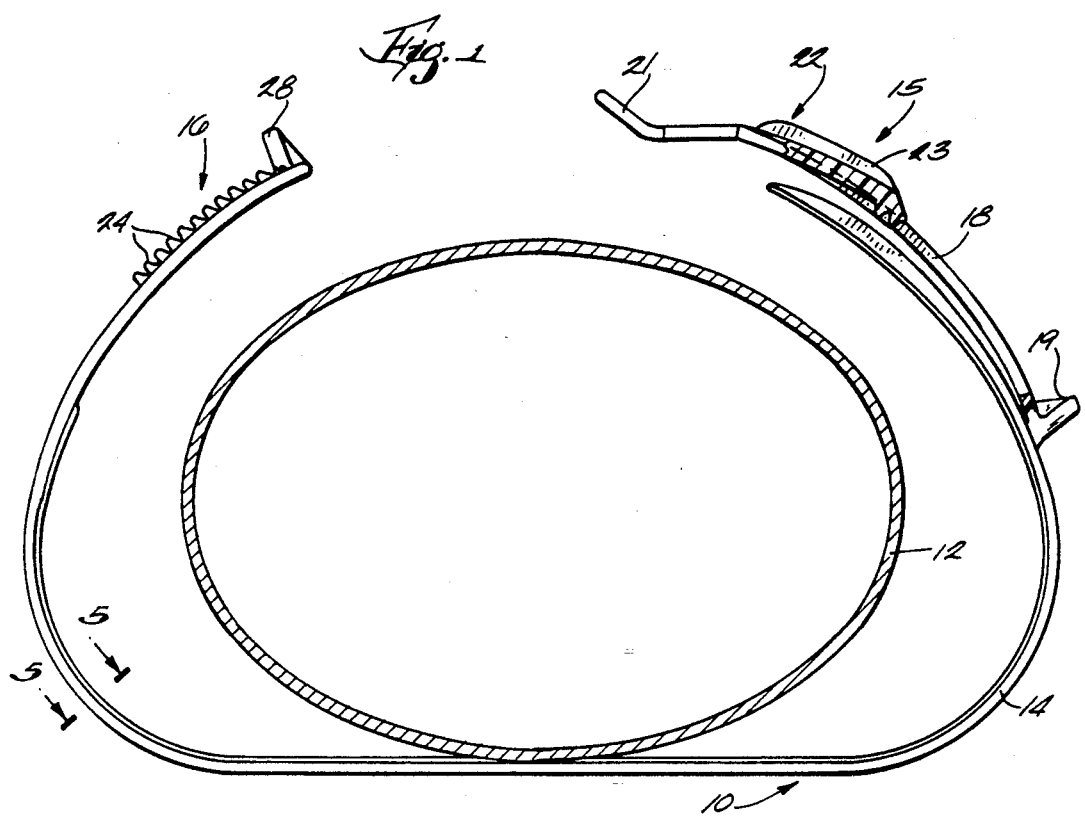
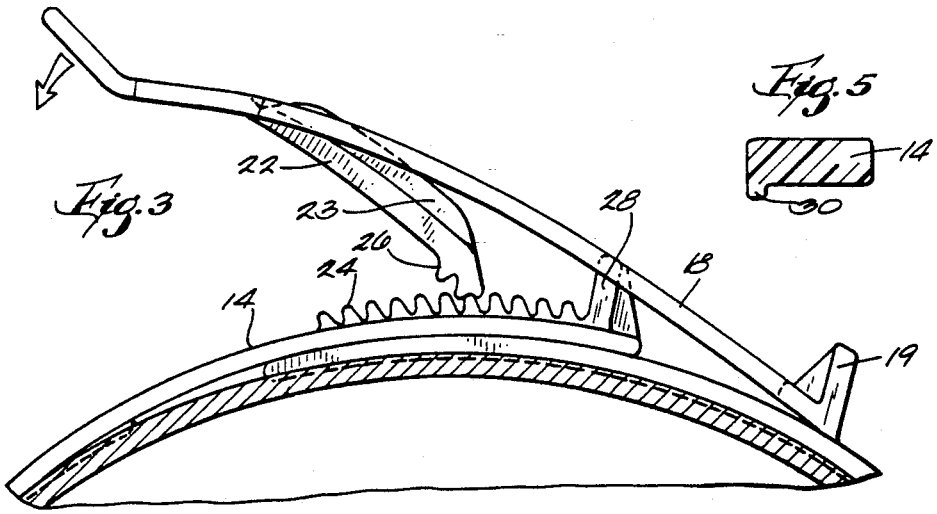
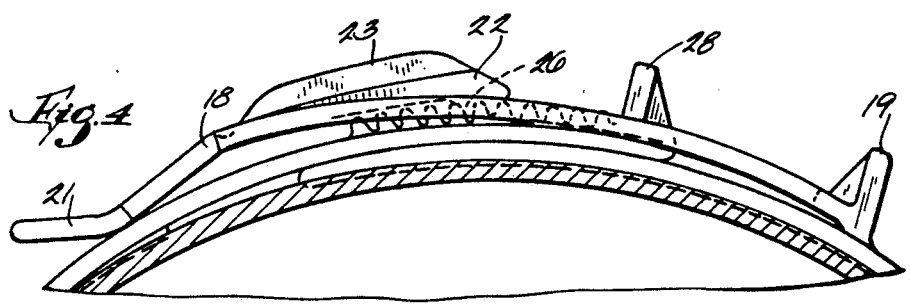

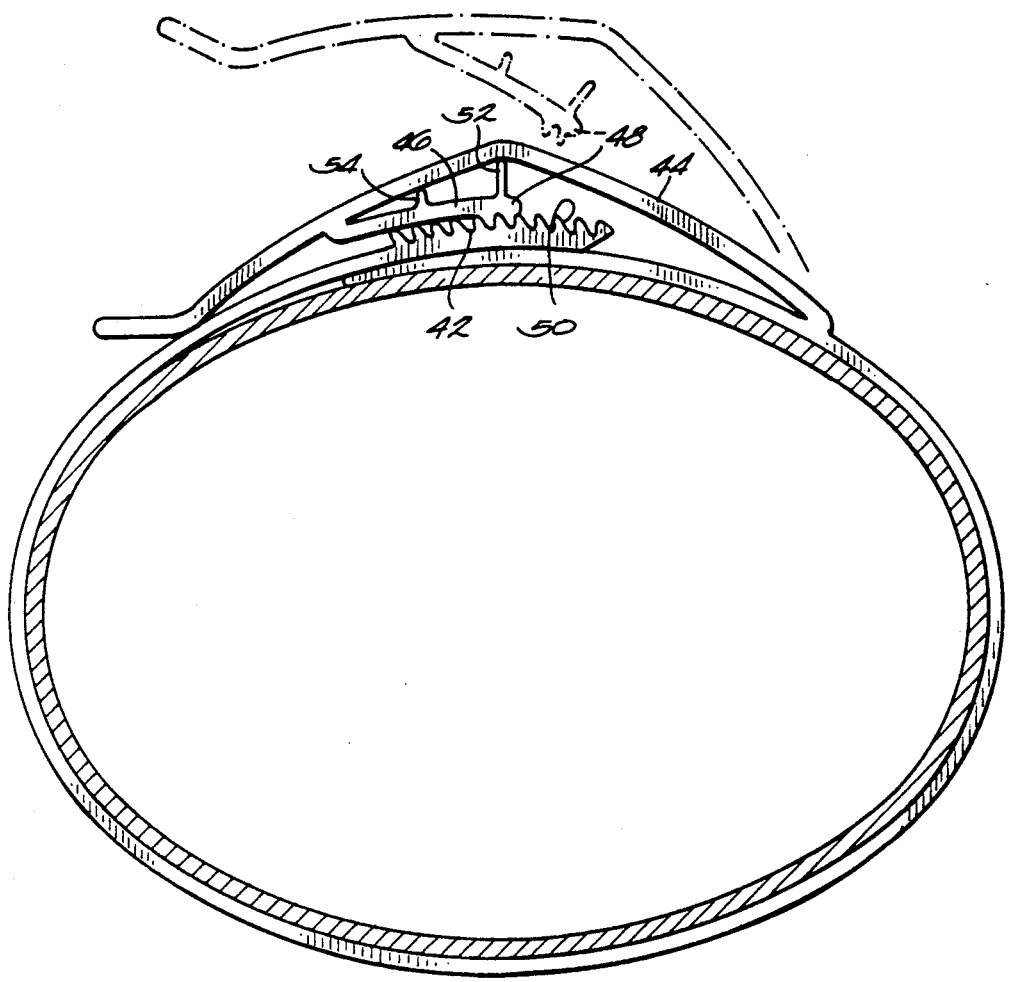
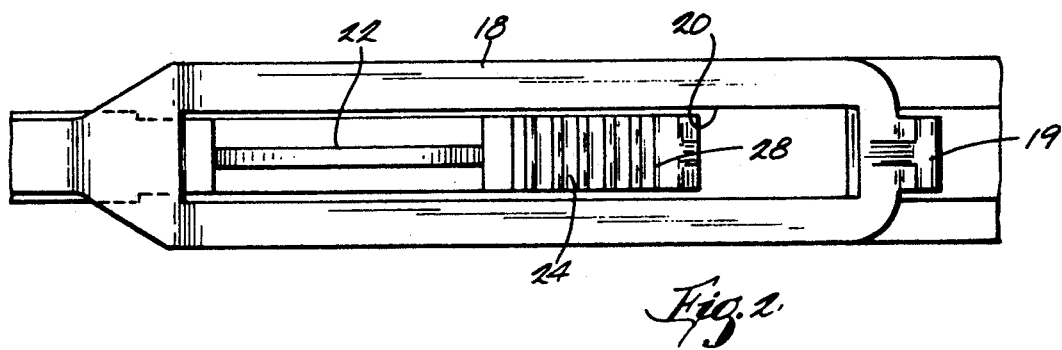

CONDUIT CLAMP

BACKGROUND OF THE INVENTION

This invention relates to clamps for securing conduits and the like.

One type of conduit clamp comprises an open loop or band of a polymeric material having complementary, interlocking clamps at each end. The clamps include jaw portions having opposed, engageable teeth angled to permit sliding movement toward a closed position but which interlock to oppose movement toward an open position. Such clamps also commonly include tongue portions resiliently engageable with the opposite sides of the jaw portions for biasing the teeth against separation. The end clamps also include manually engagement pressure pads for forcing the clamps into a closed position. Conduit clamps of this type are disclosed, for example, in U.S. Pat. Nos. 4,128,918, 4,306,740, and 4,312,525.

Such prior art conduit clamps are not wholly satisfactory because of the difficulty in releasing the interlocked jaws.

SUMMARY OF THE INVENTION

It is an object of the invention to provide a new and improved conduit clamp.

Another object of the invention is to provide a conduit clamp which permits rapid engagement and release.

A further object of the invention is to provide a conduit clamp which can be engaged and released without the need for tools.

These and other objects and advantages of the invention will become more apparent when taken together with the drawings and the detailed description thereof.

In general terms, the invention comprises a snap-on clamp for securing a conduit and including band means formed into a loop and interlocking clamping portions disposed on each end of the band means. One of the clamping portions has a plurality of teeth disposed adjacent one end of the loop. The other clamping portion comprises a first arm means pivotally mounted on the band at a point spaced from the other end of the loop with the first arm means extending from its pivotal connection toward the other end of the loop and a clamp arm means pivotally mounted on the first arm means and extending generally away from the opposite end of the loop. The clamp arm means has at least one tooth formed adjacent the free end for engaging the teeth means on the first clamping portion, the resiliency of the clamp arm means urging the first arm means toward an overcenter position and into engagement with the loop, thereby to latch the teeth on the clamp arm means within the teeth means formed in the first clamping portion.

BRIEF DESCRIPTION OF THE DRAWINGS

FIG. 1 is a side view showing a conduit clamp according to the preferred embodiment of the invention in an open position;

FIG. 2 is a top view of the conduit clamp illustrated in FIG. 1;

FIGS. 3 and 4 illustrate the clamping action of the conduit clamp illustrated in FIG. 1;

FIG. 5 is a view taken along lines 5—5 of FIG. 1;

FIG. 6 is a view showing an alternate embodiment of the invention; and

DETAILED DESCRIPTION OF THE PREFERRED EMBODIMENT

Figure 7:
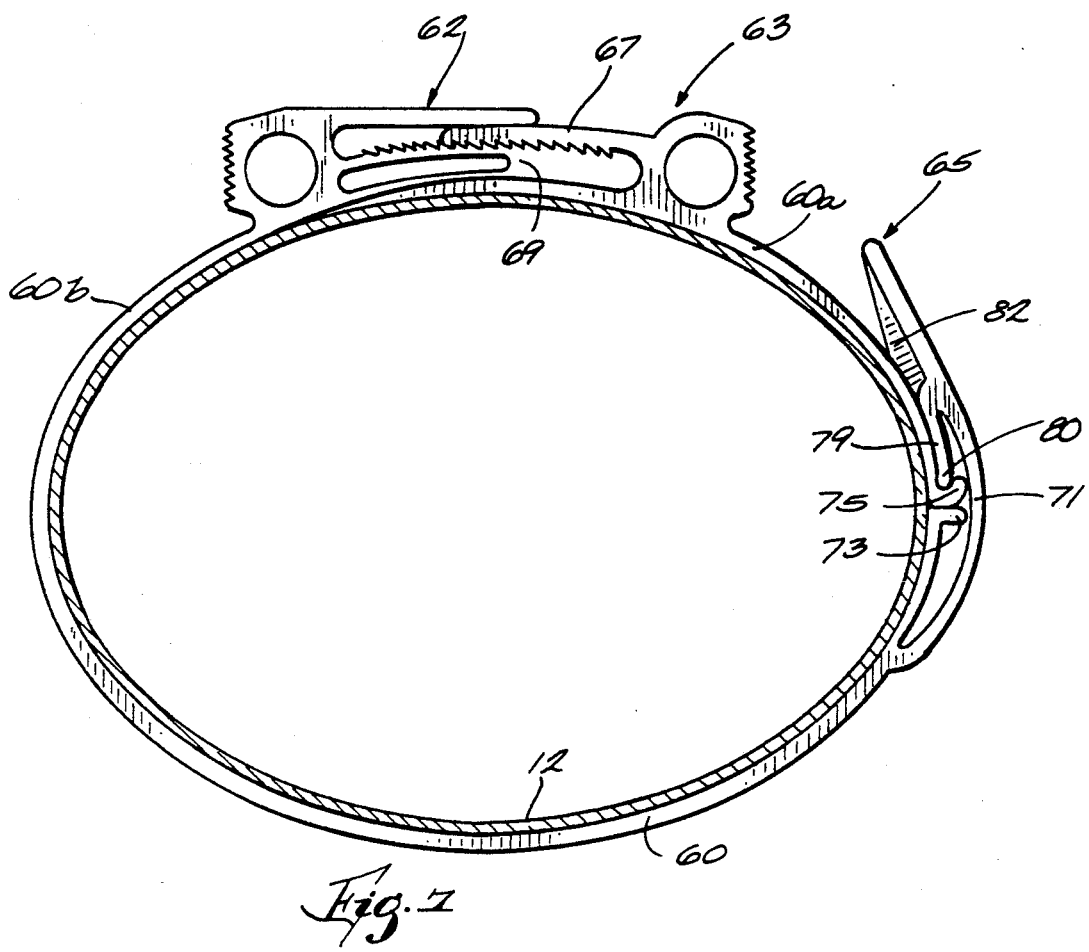
FIG. 7 is a side view showing an alternate embodiment of the invention.

FIGS. 1–4 show a clamp 10 according to the preferred embodiment of the invention for securing a conduit such as 12. The clamp 10 is formed of a suitable flexible plastic material and includes a band 14 formed in an open-ended loop and having interlocking clamping portions 15 and 16 integrally formed on each end. While the band 14 is shown in FIG. 1 to be generally oval, those skilled in the art will appreciate that the band 14 can have any shape as required to clamp the conduit 12 being secured. In addition, the cross sectional configuration of the band 14 may have any convenient shape commensurate with the required strength, the composition of the material being employed and the method of manufacture. In the illustrated embodiment, the cross-sectional configuration is generally rectangular as shown in FIG. 5.

Clamping portion 15 comprises a first arm 18 pivotally mounted on a hinge member 19 extending radially from the surface of band 14 at a point displaced from the band's free end. The arm 18 extends backwardly toward the clamping portion 16 in general parallelism with the band 14. As seen in FIG. 2, arm 18 comprises an elongate strip having a rectangular central opening 20. The free end of arm 18 is formed with inwardly and outwardly extending sections to define a thumb engaging portion 21.

A second arm 22 is mounted at one end of opening 20 and extends backwardly toward the hinge 19. The width of arm 22 is slightly less than that of the opening 20 to permit arm 18 to move freely therethrough. A spine 23 may be formed longitudinally along the back of arm 22 to provide additional strength. Arms 18 and 22 may be pivoted in any suitable manner. For example, arm 18 has an enlarged end portion which is integrally formed with the pivot 19 and the end of arm 22 is similarly integrally formed with the arm 20 and both pivot or flex as a result of the inherent resiliency of the plastic material from which they are formed. These connections of arms 18 and 22 form what are commonly referred to as living hinges.

The second clamping portion 16 includes a plurality of teeth 24 formed on the outer surface of band 14 and adjacent its opposite end. The teeth 24 are oriented with their axes generally transverse to the band 14 and extend from side to side. In addition, one or more teeth 26 are formed on the free end of arm 22 and are complementary with the teeth 24.

When it is desired to close the clamp 10, the free end of band 14 below arm 18 is slid beneath the clamping portion 16 until further closure is resisted by conduit 12. The teeth 26 are then engaged with a pair of the teeth 24, after which the thumb portion 21 is forced inwardly, thereby moving the arms 18 and 22 through an overcenter position and into tight clamping engagement. The width of the end of band 14 which defines the clamping portion 16 is less than that of the opening 20 so that clamping portion 16 does not inhibit overcenter movement of arm 18. In addition, a guide 28 formed on the end of the clamping portion 16 extends upwardly through the opening 20 to maintain the two ends of the band 14 in alignment. The resiliency of the band 14 holds the arms 18 and 22 in their overcenter position so that the conduit 12 is tightly clamped. Moreover, when it is desired to release the clamp 10, the end 21 of arm 18 can be engaged and pivoted upwardly from its position shown in FIG. 4 to its position shown in FIG. 3 whereby the clamp is released. The overcenter action allows the clamp 10 to be engaged and released without the need for tools.

As seen in FIG. 5, the band 14 may be provided with a circumferential lip 30 along one edge for engaging the end of the conduit being clamped and thereby hold the clamp 10 in position.

FIG. 6 shows an alternate embodiment of the invention to include a band 40 having a first clamping portion 41 and a second clamping portion 42 at its opposite ends. The clamping portion 41 consists of a bow-shaped arm 44 integrally formed at one end on band 40 and having a second arm 46 extending backwardly from a point between its center and its free end. The arm 46 has one or more teeth 48 formed on the underside of its free end and which are complementary to each of a plurality of teeth 50 formed on the outer surface of band 40 and adjacent its opposite end to define the second clamping portion 42. The clamping of the clamp 38 is accomplished by inserting teeth 48 into engagement with a pair of the teeth 50 and pushing downwardly on the free end of arm 41. A pair of fingers 52 and 54 extending radially from the clamping portion 46 are engaged by the underside of the clamping arm 44 so that the teeth 48 are resiliently held in position.

Figure 8:
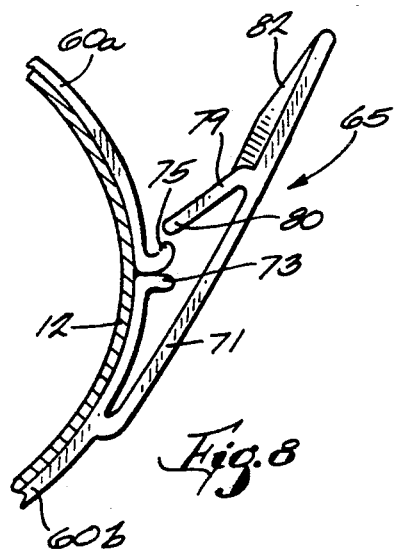
FIG. 8 is a view of the clamp of FIG. 7 in an alternate position.

FIGS. 7 and 8 show an alternative embodiment of the invention to include a band 60 having the more conventional interlocking clamps 62 and 63, but combined with the type of quick release clamp 65 of this invention. In this embodiment, band 60 is made up of two separate segments and 60a and 60b. Clamps 62 and 63 operate in the manner discussed under the Background of Invention. That is, they are provided with jaw portions 67 and 69 having opposed, engageable teeth angled to permit sliding movement toward a closed position but which interlock to oppose movement toward an open position.

Clamp 65 comprises an arm 71 integrally joined at one end to the band portion 60b at a point slightly below the bands major axis. The band port 60b has an integrally formed finger 73 which radiates outwardly and, when the clamps are all closed, abuts hook portion 75 on band position 60a and which curves backwardly toward the clamp 63 to form a tooth. The arm 71 has an integrally formed extension 79 projecting obliquely back toward the hook on tooth 75. The end 80 of arm 71 is formed as a tooth which, similar to teeth 26 and 24, is complimentary to hook or tooth 75. In addition, a web 80 is formed on arm 71 between its end and projection 79 and extends inwardly toward the band 60.

When the band 60 is initially placed around the conduit 12, and with clamp 65 in the position of FIG. 7, the band is tightened around the conduit to its desired position by manipulating clamps 62 and 63 in a conventional manner. More particularly and with respect to clamp 65, the tooth end of projection 79 is disposed in hook on tooth 75. This holds the midpoint of arm 71 against the finger 73 and the outer surface of the hook 75 with the upper end of the arm 71 resiliently held in an over-center position against band 60. Band 60 can then be opened and closed in a quick and reliable manner by manipulating clamp 65 in the same manner as the quick release clamps of the other embodiments.

More particularly, band 60 is clamped in place by engaging teeth 75 and 80 and moving arm 71 over-center in a counter clockwise direction into engagement with band 60. Conversely, band 60 is released by grasping arm 71 and moving it clockwise to an overcenter position to the orientation of FIG. 8.

While only a few embodiments of the invention have been illustrated and described, it is not intended to be limited thereby, but only by the scope of the appended claims.

I claim:

1. A snap-on clamp for securing a conduit including band means having separate ends and formable into a loop, interlocking clamping portions disposed at each end of said band means, one of said clamping portions having a plurality of teeth means disposed adjacent one end of said loop, said other clamping means comprising first arm means pivotally mounted on the band and at a pivot point spaced from the other end of said loop, said first arm means extending from its pivotal connection toward the other end of said loop, and a clamp arm pivotally mounted on said first arm means and extending generally away from the opposite end of said loop, said clamp arm means having at least one tooth formed adjacent the free end thereof for engaging the teeth means on the first clamping portion to thereby establish the connection between said separate ends, the resiliency of said clamp arm means urging said first arm means toward an overcenter position and into engagement with said loop thereby to latch the teeth on the clamp arm means within the teeth formed of the first clamping portion and thereby forming said band means into a closed loop.

2. The clamp set forth in claim 1 wherein said teeth means comprise a row of teeth integrally formed on the one end of the loop means and having axes generally transverse thereto, the tooth means on the end of the second arm means being complementary to said teeth.

3. The clamp set forth in claim 2 wherein said first arm means bows outwardly from said band means, said clamp arm means including projecting means for preventing said first arm means from collapsing inwardly when in its overcenter position.

4. A snap-on clamp for securing a conduit including band means formed into a loop, interlocking clamping portions disposed at each end of said band means, one of said clamping portions having a plurality of teeth means disposed adjacent one end of said loop, said other clamping means comprising first arm means pivotally mounted on the band and at a pivot point spaced from the other end of said loop, said first arm means extending from its pivotal connection toward the other end of said loop, a clamp arm pivotally mounted on said first arm means and extending generally away from the opposite end of said loop, said clamp arm means having at least one tooth formed adjacent the free end thereof for engaging the teeth means on the first clamping portion, the resiliency of said clamp arm means urging said first arm means toward an overcenter position and into engagement with said loop thereby to latch the teeth on the clamp arm means within the teeth formed of the first clamping portion, and said first arm means having an elongate opening formed therein and extending longitudinally, said opening having a first end proximate to the pivot point and a second end remote therefrom, the second arm means being pivotally mounted adjacent the remote end of said opening and extending longitudinally within said opening.

5. The clamp set forth in claim 4 and including guide means formed on the one end of said loop and extending radially therefrom, said guide means being received within said opening to maintain the ends of said loop in alignment when said first and second arm means are in a clamped position.

6. The clamp set forth in claim 5 wherein said teeth means comprise a row of teeth integrally formed on the one end of the loop means and having axes generally transverse thereto, the tooth means on the end of the second arm means being complementary to said teeth.

7. A snap-on clamp including band means having separate first and second ends and formable into a loop, interlocking clamping portions disposed at each of said band means ends, one of said clamping portions having tooth means disposed adjacent said first end, said other clamping means comprising first arm means pivotally mounted on the band and at a pivot point spaced from said second end of said band means, said first arm means extending from its pivotal connection toward said second end, and a clamp arm pivotally mounted on said first arm and extending generally away from said second end, said clamp arm means having at least one tooth formed adjacent the free end thereof for engaging the tooth means on the first clamping portion to thereby establish the connection between said separate first and second ends, the resiliency of said clamp arm means urging said first arm means toward an overcenter position and into engagement with said loop thereby to latch the teeth on the clamp arm means within tooth means formed of the first clamping portion and thereby forming said band means into a closed loop.

8. A snap-on clamp including band means having first and second ends and formed into a loop, interlocking clamping portions dispersed at each of said band means ends, one of said clamping portions having tooth means disposed adjacent said first end, said other clamping means comprising first arm means pivotally mounted on the band and at a pivot point spaced from said second end of said band means, said first arm means extending from its pivotal connection toward said second end, a clamp arm pivotally mounted on said first arm and extending generally away from said second end, said clamp arm means having at least one tooth formed adjacent the free end thereof for engaging the tooth means on the first clamping portion, the resiliency of said clamp arm means urging said first arm means toward an overcenter position and into engagement with said loop thereby to latch the teeth on the clamp arm means within tooth means formed of the first clamping portion, and said band means including plural portions forming said loop, said interlocking clamping portions being located on adjacent portions of said loop, and including third and fourth interlocking clamping means attached to an end of said loop portions and spaced from said first mentioned interlocking clamping portions, said third and fourth interlocking clamping means including means defining teeth angled to permit sliding movement of said third and fourth interlocking clamping means into interlocking engagement and also operative to interlock when said third and fourth interlocking means are moved in an opposite direction to thereby oppose movement of said third and fourth interlocking clamping means toward an open position.

* * * * *